C. W. BECK.
SPARK PLUG.
APPLICATION FILED MAR. 17, 1910.
1,084,838. Patented Jan. 20, 1914.
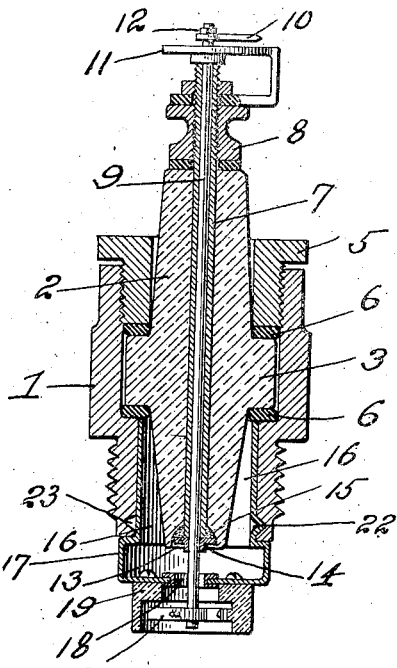
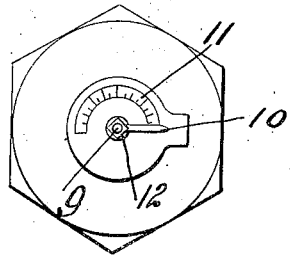
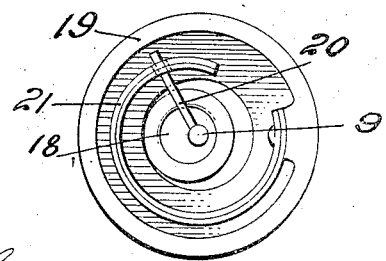
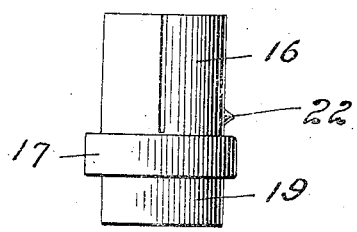
WITNESSES:
Chas. W. Beck INVENTOR
ATTORNEYS

UNITED STATES PATENT OFFICE.

CHARLES W. BECK, OF ROCKVILLE CENTER, NEW YORK, ASSIGNOR, BY MESNE ASSIGNMENTS, TO MICHIGAN MOTOR SPECIALTIES COMPANY, OF DETROIT, MICHIGAN, A CORPORATION OF MICHIGAN.

SPARK-PLUG.

1,084,838.  Specification of Letters Patent.  Patented Jan. 20, 1914.

Application filed March 17, 1910. Serial No. 549,875.

*To all whom it may concern:*

Be it known that I, CHARLES W. BECK, a citizen of the United States, and resident of Rockville Center, county of Nassau, and State of New York, have invented certain new and useful Improvements in Spark-Plugs, of which the following is a specification.

In internal combustion motors with more than one cylinder it frequently happens that one or more of the cylinders do not properly work, that is to say, the mixture therein is not ignited. It is always difficult to determine, in cases of this kind, which cylinder is not working, that is to say, in which cylinder the mixture is not ignited.

Various devices are used for determining whether electric current is being supplied to the spark plugs, but so far as I am aware, there are no devices which indicate when the mixture is being exploded and when it is not. A device of this kind is extremely desirable as it will at once indicate which cylinder of a multiple cylinder engine is failing to do its work. Ordinarily when one cylinder of a multiple cylinder engine fails to do its work, each cylinder must be separately tested in order to locate the trouble.

It is the main object of this invention to provide means which will indicate at once whether or not the mixture is being exploded within the cylinder. I accomplish this by means of an expanding device properly supported within the cylinder, said device being responsive to variations in temperature and connected to an indicator supported outside of the cylinder in a convenient position for observation. The expanding device and the indicator constitute a thermostat which will serve to indicate the approximate degree of heat within the cylinder so that when the mixture is exploding the high degree of heat generated within the cylinder will be apparent from the position of the indicator.

Another object of the invention is to conveniently combine the thermostat with a spark plug. By this means the thermostat may be placed in position on the cylinder when the spark plug is secured in place, and may be removed by removing the spark plug. This is of advantage for the reason that it avoids the necessity of drilling extra holes in the engine cylinder for the purpose of attaching the thermostat.

It will, of course, be understood that I may use any suitable form of device responding to changes in temperature and any suitable indicating means connected thereto for showing whether or not there is heat within the cylinder.

Referring to the drawings: Figure 1 is a central longitudinal sectional view of a spark plug provided with a thermostat; Fig. 2 an end view of the outer end thereof; Fig. 3 a similar view of the inner end thereof; and Fig. 4 a detail side elevation of the detachable firing cap which carries the expanding device.

Referring to the various parts by numerals, 1 designates the base of the plug which is adapted to be screwed into the engine cylinder. Within this base is mounted a porcelain insulating core 2, said core being formed with the enlargement 3. A core securing and retaining gland 5 is screwed into the outer end of the base, and washers 6 are interposed between said gland and the enlargement of the core, and between said enlargement and the shoulders formed within the base. By this means the insulating core may be securely held within the base without danger of fracturing it. Secured within the insulating core and extending longitudinally therethrough is a metallic tube 7 which is cemented into the insulator, said tube being open at its ends, the outer end thereof projecting beyond the outer end of the core or insulator, said outer end being externally threaded for the reception of a binding nut 8. Extending through said tube and arranged to rotate therein is an indicator rod 9 provided at its upper end with an index finger 10 adapted to swing around a dial 11, said dial being rigidly clamped on the tube by means of a nut 12. The indicator rod is provided with a collar 13 which is adapted to fit within the cavity 14 formed in the inner end of the porcelain or insulating core. Said collar bears directly against the inner end of the tube and serves to retain in the cavity an asbestos packing 15. By this means gas from the engine cylinder is prevented from entering the inner end of the tube 7.

Within the inner end of the base is detachably secured a hollow metallic cap 16, said cap being formed with the enlargement 17 at its inner end, and with the aperture 18, said aperture being eccentric to the axis of the insulator. To the inner end of the cap is secured a porcelain cup 19, said cup being formed with an opening larger than the opening through the cap, but concentric therewith. The indicator rod extends into the porcelain cup and is provided with a lateral arm 20. Within the cup is mounted an expanding device 21, the said device being formed of two curved bars having different rates of expansion, said bars being rigidly secured at one of their ends to the inner side of the cup, their other ends being free to move in an arc when expanded by heat. This form of expanding device is well-known, and the element which expands more rapidly and to a greater extent is placed on the outer side of the other element or bar, whereby when the device as a whole is expanded by heat its free end will move in an arc around the indicator rod. The lateral arm 20 of the indicator rod is loosely connected to the expanding device near its free end so that as said device expands and rotates, it will carry with it the arm 20 of the indicator rod. It will thus be seen that when the engine is properly firing and its mixture properly exploded the device 21 will be expanded thereby giving an indication through the index finger 10 that the engine cylinder is working.

It will, of course, be understood that whenever a cylinder fails to fire or explode the temperature will soon be reduced sufficiently to permit the device 21 to contract and thereby return the index finger to its normal or zero position, or approximately so, thus indicating immediately that the engine is not properly working. The indicator rod also forms the electrode and the igniting spark is formed between said rod and the margin of the aperture through the cap. The terminal wire is connected to the binding nut 12 in the usual manner, and as the indicator rod and the tube 7 are in close contact throughout the length of the tube the current will flow from said tube to said rod.

The firing cap is split longitudinally throughout its length and frictionally engages the interior of the base. It is formed with the projection 22 which is adapted to snap into an annular groove 23 formed in the interior of said base. By this means the said cap is removably but firmly held within the base.

To detach the thermostat from the plug it is only necessary to disconnect the device 21 from the arm of the indicator rod and then detach the firing cap from the base. By removing the index finger from the upper end of the indicator, the said rod may be removed from within the tube 7. The index finger may be screwed or otherwise removably secured to the upper end of the indicator rod to facilitate the removal of the rod from the tube. It is manifest that the bar 21 must be secured to an insulating part, and for that reason the porcelain cup 19 is secured to the end of the firing cap and the bar 21 mounted within said cup.

It will, of course, be understood that the specific arrangement of the parts of the plug and the thermostat may be varied, and that any suitable form of thermostat and spark plug may be employed, and I, therefore, do not wish to be limited to the precise construction shown and described herein. It will also be understood that any suitable form of heat indicating means may be employed.

It will, of course, be understood that the device may be employed as a pyrometer to indicate the degrees of heat in the combustion chamber during the explosions.

Having thus fully described my invention, what I claim as new and desire to secure by Letters Patent is:

1. A spark plug comprising a base, an insulating core extending through said base, an indicating rod extending through said core, a device responsive to the changes in temperature connected to the inner end of said rod, and an index finger connected to the outer end of said rod.

2. A spark plug provided with a device responsive to the changes in temperature and with an index finger or point, the said device being adapted to be placed within the engine cylinder, and the index finger point being adapted to be arranged outside of the engine cylinder, and means connecting the device with the index finger.

3. A spark plug provided with an expansion device movable in response to changes in temperature and means connected to said expansion device to indicate the movements thereof.

4. A spark plug provided at its inner end with a movable expansion device and with means extending longitudinally through the spark plug for indicating the movements of the said expansion device.

5. A spark plug consisting of a base, an insulating core, an indicating rod extending centrally through the core, said rod serving as an electrode, an expansion device connected to the inner end of said rod and movable in response to changes of temperature to rotate said rod and an index finger connected to the outer end of said rod.

6. A spark plug comprising a base, an insulating core within the base, a rotatable indicating rod extending longitudinally through the said core and serving as an electrode, a firing cap secured within the base and carrying an insulating cup at its inner end, an expansion device secured within said insulating cup and connected to the indicating rod, and an index finger connected to the outer end of said rod.

7. The combination of a base or holder adapted to be connected to an engine cylinder, an indicator rod carried by said base, an expansion device adapted to be moved by changes in temperature and connected to the inner end of said rod and adapted to be within the cylinder when the base is connected thereto, and means whereby said rod will indicate the movements of the expansion device.

8. The combination of a base adapted to be screwed into an engine cylinder, an indicator rod extending longitudinally, through and supported by said base, an expansion device connected to the inner end of said rod and adapted to be within the cylinder when the base is connected thereto, and means whereby the expansion and contraction of said device will be indicated through said rod.

In testimony whereof I hereunto affix my signature in the presence of two witnesses this 16th day of March 1910.

CHARLES W. BECK.

Witnesses:
F. R. MILLER,
WM. R. DAVIS.